US008840506B2

(12) United States Patent
Schwekutsch et al.

(10) Patent No.: US 8,840,506 B2
(45) Date of Patent: Sep. 23, 2014

(54) PARKING LOCK FOR A MOTOR VEHICLE AND METHOD OF OPERATING A PARKING LOCK

(75) Inventors: Michael Schwekutsch, Wermelskirchen (DE); Theodor Gassmann, Siegburg (DE); Mark Schmidt, Königswinter (DE)

(73) Assignee: GKN Driveline International GmbH, Lohmar (DE)

( * ) Notice: Subject to any disclaimer, the term of this patent is extended or adjusted under 35 U.S.C. 154(b) by 229 days.

(21) Appl. No.: 13/375,993

(22) PCT Filed: May 6, 2010

(86) PCT No.: PCT/EP2010/056170
§ 371 (c)(1),
(2), (4) Date: Jan. 25, 2012

(87) PCT Pub. No.: WO2010/139524
PCT Pub. Date: Dec. 9, 2010

(65) Prior Publication Data
US 2012/0115665 A1 May 10, 2012

(30) Foreign Application Priority Data
Jun. 2, 2009 (DE) .......................... 10 2009 023 498

(51) Int. Cl.
*F16H 48/30* (2012.01)
(52) U.S. Cl.
USPC .................... 475/150; 192/219.5; 180/65.6
(58) Field of Classification Search
USPC .......... 475/150, 230, 343; 74/335; 192/219.4, 192/219.5; 180/65.6
See application file for complete search history.

(56) References Cited

U.S. PATENT DOCUMENTS

| 4,519,483 A | 5/1985 | Schlicker |
| 5,743,348 A | 4/1998 | Coppola et al. |
| 5,807,205 A | 9/1998 | Odaka et al. |
| 6,273,232 B1 | 8/2001 | Kimura et al. |
| 6,361,469 B1 | 3/2002 | Roder et al. |
| 6,471,027 B1 * | 10/2002 | Gierer et al. ............... 192/219.5 |
| 6,510,934 B2 | 1/2003 | Arakawa |
| 7,025,188 B2 | 4/2006 | Lindenschmidt et al. |
| 2001/0042669 A1 * | 11/2001 | Arakawa .................... 192/219.5 |
| 2007/0283735 A1 * | 12/2007 | Schweiher et al. ............. 70/245 |

(Continued)

FOREIGN PATENT DOCUMENTS

| DE | 19533141 C1 | 2/1997 |
| DE | 10045953 A1 | 5/2002 |

(Continued)

OTHER PUBLICATIONS

PCT International Search Reported dated Jul. 29, 2010 for PCT/EP2010/056170.

*Primary Examiner* — Roger Pang
(74) *Attorney, Agent, or Firm* — Bejin VanOphem & Bieneman PLC

(57) ABSTRACT

A parking lock assembly for a motor vehicle is described that has at least one electrically drivable driving axle. The parking lock comprises an electric drive, a shaft which is arranged in the driveline of a motor vehicle and which is drivable by the electric drive, as well as a locking mechanism which is controllable in the locking sense in order to prevent a rotational movement of the shaft and which is controllable in the opening sense in order to release the shaft. The electric drive is controllable in order to transmit torque to the shaft if, in spite of the locking mechanism being controlled in the opening sense, the shaft is prevented from carrying out a rotational movement. Furthermore, a method of actuating such a parking lock assembly is described.

11 Claims, 4 Drawing Sheets

(56) References Cited

U.S. PATENT DOCUMENTS

2008/0033617 A1 2/2008 Watanabe et al.
2011/0198190 A1* 8/2011 Steinhauser et al. ....... 192/219.5

FOREIGN PATENT DOCUMENTS

| | | |
|---|---|---|
| DE | 10316949 A1 | 11/2004 |
| DE | 102005002446 A1 | 7/2006 |
| DE | 102007008088 A1 | 8/2008 |
| EP | 1327566 A1 | 7/2003 |
| GB | 2438411 A | 11/2007 |
| JP | 04055153 A | 2/1992 |
| JP | 05077699 A | 3/1993 |
| JP | 2000074211 A * | 3/2000 |
| WO | WO-2006025543 A1 | 3/2006 |
| WO | WO-2006028026 A1 | 3/2006 |

* cited by examiner

PARKING LOCK FOR A MOTOR VEHICLE AND METHOD OF OPERATING A PARKING LOCK

CROSS REFERENCE TO RELATED APPLICATIONS

This application is a National Phase of International Application No. PCT/EP2010/056170, filed on May 6, 2010, which claims priority to German Application No. 10 2009 023 498.5 filed on Jun. 2, 2009, both of which applications are hereby incorporated by reference in their entirety.

TECHNICAL FIELD

The disclosure relates to a parking lock for a motor vehicle and to a method of actuating such a parking lock. Such parking locks are used in order to inhibit a shaft of the motor vehicle gearbox so that the vehicle can be prevented from unintentionally rolling away if the engine does not provide any torque. More particularly, this disclosure may apply if the vehicle is parked on a hill.

BACKGROUND

From DE 10 2005 002 446 A1 there is known a parking lock of an automatic transmission for a motor vehicle. Said parking lock comprises a locking member which can be actuated via an actuating drive and which is held in the locking position by a spring; it also comprises a holding device which can hold the locking member in the unlocking position, independently of the actuating drive. The holding device comprises a toggle mechanism which is aligned in the unlocked position so that the actuating force for releasing the parking lock is reduced.

From DE 10 2007 008 088 A1 there is known a manual vehicle gearbox with an actuating element for an emergency release of the parking lock.

From DE 199 21 918 A1 there is known a parking lock for a motor vehicle with an electric drive as well as a method of actuating such a parking lock. The parking lock comprises a mechanical and an electric component. The electric component is designed in such a way that it is able to generate a short circuit in the stator windings, so that the electric machine generates a high braking torque which brakes the driveline. After a certain time interval has elapsed, there is activated the mechanical component of the parking lock which can finally bring the driveline to a standstill. This design is said to make it possible to use smaller parking locks. Activation of the parking lock is to take place only if the limit speed of the motor vehicle is below a defined value.

SUMMARY

A parking lock assembly for a motor vehicle with an electric drive is disclosed wherein the forces required for disengaging the parking lock are reduced and which, additionally, has a simple design and which can be produced cost-effectively. Furthermore, a method of actuating a parking lock assembly for a motor vehicle with an electric drive is also disclosed, the method making it possible to reduce the forces required for disengaging the parking lock.

The disclosed parking lock assembly for a motor vehicle with an electric drive comprises an electric drive; a shaft which is arranged in the driveline of the motor vehicle and which can be driven by the electric drive; a locking mechanism which is controllable in a locking sense in order to inhibit a rotational movement of the shaft and which is controllable in an opening sense in order to release the shaft, wherein the electric drive is controllable in order to transmit a torque to the shaft if, in spite of the locking mechanism being controlled in the opening sense, the shaft is prevented from carrying out a rotational movement. Such an inhibition resulting in the release of the shaft can occur, for example, as a result of pretensioning forces or friction forces in the parking lock assembly.

An advantage of such an embodiment that may be achieved is that the electric drive can be used for reducing the actuating forces required for releasing the locking mechanism, which, in turn, positively influences the design of all elements and components of the locking mechanism. Furthermore, the tolerances in respect of geometry and surface requirements of the individual elements and components, which tolerances are needed for the functioning ability of the locking mechanism, can be relaxed, i.e., the range may be broadened, which, in turn, lowers the production costs. A further advantage that may be achieved in that individual elements and components can be provided with smaller dimensions. More particularly, if an electro-mechanical actuator is used for the locking mechanism, such an actuator can be smaller. Equally, a spring needed for the return of the locking mechanism can be smaller, i.e. it can be provided with a lower spring force. Overall, said measures have an advantageous effect on the design, the size and the weight of the locking mechanism. A further advantage that may be achieved is that, due to the lower actuating forces, the degree of wear on the force-loaded components is reduced, which, in turn, advantageously affects the service life. In addition, actuation requires less power for actuating an electric or electro-mechanical actuator, as a result the load on the electric power supply system is reduced.

In principle, the shaft can be any torque transmitting component which is arranged in the driveline between the electric drive and the wheels of the motor vehicle. For example, the shaft can be an input shaft, an output shaft, a transmission shaft or any other component which transmits torque to the wheels, such as a differential carrier of a differential drive or a component of a brake. To have a locking effect on the wheels of the motor vehicle, a direct torque transmitting connection with the wheels must exist, i.e. there must not be any coupling between the wheels and the shaft, as a result of which the torque flow would be interrupted. Below, use will be made of the general terms "shaft" or "driveshaft". The inventive parking lock assembly disclosed herein can be used both for motor vehicles with an electric drive only and for motor vehicles with a so-called hybrid drive, i.e. with an internal combustion engine and an electric motor.

For controlling the electric drive, an electronic control unit may be provided. Said electronic control unit can be integrated into an existing control unit of the motor vehicle or it can be a separate unit. Furthermore, there may be provided a locking sensor which is able to generate a locking signal representing the switched position of the locking mechanism and is able to transmit said signal to the electronic control unit. The locking sensor can be an optical sensor for example which records the position of an element of the locking mechanism, for instance of an engaging pawl. In principle, the locking mechanism can have any design and comprise any kind of mechanism. For actuating purposes there can be provided an electro-mechanical actuator or a purely mechanical hand-operated actuator, with pneumatic and hydraulic actuators also being conceivable.

Furthermore, the parking lock assembly comprises a parking lock sensor which identifies the driver's intention that the parking lock assembly should be actuated. Several possibilities are conceivable for designing and arranging the parking lock sensor. For example, the parking lock sensor may be integrated into the gear changing lever, or, alternatively, it can be a different vehicle-specific switch.

The switching operation for blocking the driveline may be effected by the inventive parking lock assembly as follows: After the parking lock sensor has identified the driver's intention that the vehicle should be parked and that the driveline should be fixed, there is generated a parking lock signal which activates the locking mechanism in the closing sense.

According to one exemplary embodiment, there is provided a speed sensor which generates a speed signal representing the speed of the vehicle and which transmits same to the electronic control unit. This means that the electronic control unit only activates the locking mechanism if the speed signal is below a predetermined limit value. In this way, it is ensured that there do not occur any high dynamic loads. In addition or alternatively, there can also be provided a speed sensor which generates a speed signal representing the speed of the shaft and which transmits same to the electronic control unit. It is also conceivable for the speed of the shaft to be calculated from the vehicle speed.

In one exemplary embodiment, the driveline is fixed by a locking member form-lockingly engaging a corresponding locking recess, with one of the two components being associated with the locking mechanism and the other one with the shaft.

If, when actuating the locking mechanism, the rotational position of the shaft is such that the locking member is positioned opposite a locking recess, the locking member, accordingly, form-lockingly engages the locking recess, so that the shaft is blocked. In accordance with one exemplary arrangement, said switched position is recorded by the locking sensor and transmitted to the electronic control unit. This results in a redundancy as regards the locking position, which ensures that the parking lock assembly is locked particularly reliably.

If, when actuating the locking mechanism, the locking member is not positioned opposite a locking recess, the locking member is pretensioned by actuating the locking mechanism by a spring arrangement. As soon as a rotational position is reached in which the locking member and a locking recess are positioned opposite one another, the locking member, due to the spring force of the spring arrangement, is pushed into the locking recess, so that the shaft is blocked.

If the locking mechanism is actuated while the vehicle is still rolling, this means that, as soon as the form-locking engagement takes place, the motor vehicle is braked abruptly and, at the same time, the driveline and the gearbox are subjected to a corresponding impact load. For calculating the maximum permissible locking speed and vehicle speed at which the parking lock can be activated, said factors are decisive and are taken into account when defining the correct limit value for the speed signal. When actuating the locking mechanism when the vehicle is standing still, the vehicle—for instance when standing on an inclined surface—is permitted to move until the locking member is positioned opposite a locking recess. To ensure safe engagement, the speed resulting from a maximum slope inclination and the vehicle mass are taken into account during the design and calculation process.

The switching process for blocking the driveline may be determined by the inventive parking lock assembly as follows: when the parking lock sensor records the driver's intention to the effect that the vehicle should be moved or that the driveline should be released again, there is generated a suitable parking lock signal which activates the locking mechanism in the opening sense.

When the vehicle is positioned on a surface with no inclination or only a slight inclination, there are applied either no forces or only very low forces between the locking member and the locking recess. By activating the locking mechanism in the opening sense, the locking member is moved by the spring arrangement out of the locking recess so that the form-locking engagement is reversed and the shaft is released once again. The locking sensor records that the locking member no longer engages the locking recess and transmits a corresponding signal to the electronic control unit. If the locking mechanism is provided with an electro-magnetic actuator, it, too, passes a corresponding signal to the electronic control unit. Vehicle operation can thus be resumed.

However, if the vehicle has been parked on a slope or on a surface with a greater angle of inclination, considerable forces occur between the locking member and the respective locking recess and between the locking element and the pressure element. These forces can be so high that, when the locking mechanism has been activated, the locking element cannot be disengaged from the locking recess or that the pressure element cannot be moved by the force of the actuator. This may be recorded by the locking sensor which passes a corresponding signal representing the position of the locking element to the electronic control unit. In such a case it is proposed that the electric drive is controlled accordingly so that a torque is introduced into the driveline or the output shaft. In this way, the stresses applied to the parking lock assembly due to the weight of the vehicle are reduced to such an extent that the locking element is disengaged from the respective locking recess. For this purpose, the torque introduced into the driveline has to act against the direction of load, i.e. in an uphill direction. More particularly, it is proposed that the torque generated by electric drive and introduced into the driveline has to be increased linearly by from zero until the sensor indicates the disengagement of the locking member.

According to one exemplary embodiment, there is provided an inclination sensor which determines a signal representing the inclination of the motor vehicle, with the electric drive being controlled in such a way the torque transmitted to the output shaft acts against the inclination-related slope output force of the vehicle and the pretensioning force of the driveline. Alternatively, the electric motor of the electronic control unit can also be supplied with power according to the random principle or to an integrated logic, i.e. first into one direction of rotation and, if, up to the point when a predetermined maximum locking torque has been reached, the locking member has not been released, into the opposed second direction.

According to one exemplary embodiment, the locking mechanism comprises a ratchet wheel which is connected to the shaft in a rotationally fixed way, as well as a locking member which cooperates with the locking gear. The locking member can be transferred into a locking position in which the locking member is connected in a form-locking way to the ratchet wheel, so that the ratchet wheel is prevented from carrying out a rotational movement, and the locking member can be transferred into an unlocking position in which the locking gear is able to rotate freely relative to the locking member. In order to transfer the locking member into the unlocking position, there may be provided a spring element which loads the locking member in the direction away from the ratchet wheel. The locking member may be provided in the form of a locking pawl which is supported so as to be pivotable around a pivot axis, with the locking pawl comprising a locking tooth which is able to engage circumferentially distributed recesses of the ratchet wheel.

Furthermore, the locking mechanism comprises a movable pressure element which cooperates with the locking pawl, wherein the pressure element can be transferred into a closing position in which the pressure element loads the locking pawl towards the locking gear and into a releasing position in which the locking pawl is released. There are provided f a first spring mechanism which load the pressure element into the closed position. Said first spring mechanism allows the pressure element to be pretensioned when the locking element, upon actuation of the locking mechanism, is positioned opposite a web between two locking recesses of the locking gear. When the locking gear continues to rotate, the pretensioned spring mechanism causes the locking member to engage the next locking recess. The locking mechanism may also comprise a second spring mechanism which loads the pressure element into the releasing position, wherein the spring force of the second spring mechanism is lower, more particularly it is reduced by a multiple as compared to the spring force of the first spring mechanism. The second spring mechanism effects the return of the pressure element into the releasing position and can therefore also be referred to as the returning spring.

For a forced unlocking of the locking mechanism, e.g. if the electronics of the parking lock or of the vehicle are defective, it is proposed according to a preferred embodiment to provide a returning mechanism by which the pressure element can be loaded into the releasing position against the spring force of the first spring mechanism. For example, the returning mechanism can comprise a returning element with a thread which, by means of suitable form-engagement arrangement, can be threaded into a suitable counter thread of the locking mechanism against the spring force of the first spring mechanism. In the case of a tensioned system, when the vehicle is positioned on a slope, the release of the locking member out of the respective locking recess can be effected by a suitable geometry of the returning element or by externally moving the vehicle.

Furthermore, a method of actuating a parking lock assembly for a motor vehicle with at least one driving axle drivable by an electronic drive, wherein the parking lock assembly comprises a locking mechanism for a shaft in the driveline of a motor vehicle is disclosed. The method comprises the following steps:

recording a parking lock signal according to which the parking lock assembly is to be actuated;

activating the locking mechanism when the parking lock signal is applied in order to release the shaft; and controlling the electric drive in order to transmit a torque to the shaft when the shaft is not released. The inventive method results in the above-mentioned advantages in that the force of the electric drive can be used for reducing the forces required by the locking mechanism for unlocking the shaft.

In one exemplary arrangement, the locking mechanism comprises a locking member which can be transferred into a locking position in which the shaft is prevented from carrying out a rotational movement, and into an unlocking position in which the shaft can be released, with there being provided a further method step, i.e. determining a locking signal which represents the position of the locking member, with the control of the electric drive taking place as a function of the locking signal of the locking member. The locking signal ensures that the electric drive is controlled reliably if—as a result of forces acting between the locking member and the driveshaft, respectively a locking gear connected to the driveshaft in a rotationally fixed way—the locking member is prevented from reaching the unlocking position.

The electric drive may be controlled in such a way that the torque transmitted to the output shaft acts against a force acting between the locking member and the shaft. For this purpose, according to one exemplary arrangement, the parking lock assembly comprises an inclination sensor, and according to a further method step it is proposed to determine the inclination of the motor vehicle, with the electric drive being controlled in such a way that the torque transmitted to the shaft acts against an inclination-related slope output force of the motor vehicle.

According to one exemplary embodiment, there are proposed the following further method steps: recording a speed signal representing the speed of the shaft and activating the locking mechanism only if the speed signal is below a predetermined limit value.

BRIEF DESCRIPTION OF THE DRAWINGS

Exemplary embodiments of the disclosure will be explained below with reference to drawings wherein.

DETAILED DESCRIPTION

Figure 1:
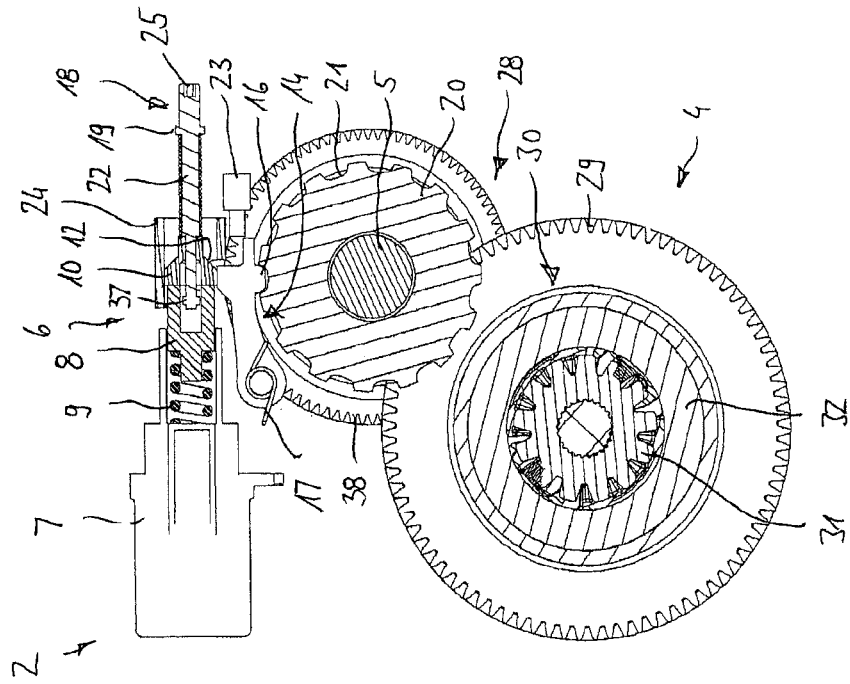
FIG. 1 shows an inventive parking lock assembly in an axial view in an open position.

Below, FIGS. 1 to 6 will initially be described jointly. FIGS. 1-6 show a parking lock assembly 2 for a motor vehicle with an electric drive 3, with only the housing of the electric drive 3 being visible. The electric drive 3 serves to drive a driving axle of the motor vehicle. The parking lock assembly 2 is arranged at a shaft 5 in the torque flow between the electric drive 3 and the driving axle 4. Apart from the shaft 5, the parking lock assembly 2 comprises a locking mechanism 6 which acts on the shaft 5. As the shaft 5 is positioned in the driveline between the electric drive 3 and the driving axle 4, it can also be referred to as the output shaft.

The locking mechanism 6 comprises an actuator 7, more particularly an electro-mechanical actuator which can be controlled by an electronic control unit. However, it is appreciated that the actuator can also be provided in alternative embodiments. For example, the actuator can be provided in the form of a hydraulic or pneumatic actuator. Furthermore, the locking mechanism 6 comprises a sliding element 8 which can be loaded by the actuator via a first spring 9, wherein the sliding element 8 can be transferred into a first slid position in which it is distant from the actuator 7 and into a second slid position in which it is close to the actuator 7. The sliding element 8 acts on a pressure element 10 which comprises a conical pressure face 12 which cooperates with a corresponding counter face 13 of a locking member 14. For returning the pressure element 10, there is provided a second spring 11 which acts against the pretensioning force of the first spring 9. The second spring 11 which can also be referred to as the returning spring comprises a much lower spring force than the first spring 9. The second spring 11 may be provided in the form of a helical spring which is arranged on a holding element 22 and is axially supported relative to same. The holding element 22 is preferably provided in the form of a guiding pin and is axially supported relative to the pressure element 10. The holding element 22 is connected to the pressure element 10, respectively to the sliding element 8, in such a way that it is axially movable relative to same to a limited extent. There is provided a stop in the form of a thickening 37 at the actuator end of the holding element 22.

The locking member 14 is provided in the form of a locking pawl which, at its one end, is supported so as to be pivotable around a pivot axis A. At its opposite free end, the locking pawl, on its outside, comprises a counter face 13 which can be loaded by the pressure face 12 of the pressure element 10, and, on its inside, it comprises a locking tooth 15 for blocking the shaft 5. The counter face 13, which can also be referred to the functional face, is inclined relative to a perpendicular line on the axis of rotation of the shaft 5, which perpendicular line extends through the contact point between the counter face 13 and the pressure face 12. In this way it is effectively ensured that a translatory movement of the sliding element 8 and, respectively, of the pressure element 10 is converted into a pivot movement of the locking pawl. For guiding the pressure element 10, there is provided a guiding sleeve 24 against which the pressure element 10 can be radially supported relative to the axis of rotation of the shaft 5.

The locking pawl serves to optionally block the shaft 5, so that the driveline is prevented from carrying out rotational movement, or to release same, so that the components of the driveline are able to rotate freely. For transferring the locking pawl from the locking position into the releasing position, there is provided a spring element 17. The spring element 17 is provided in the form of a leg spring which, by means of a first leg, is supported on a stationary component and, by means of a second leg, on the locking pawl.

Furthermore, the parking lock assembly 2 comprises a ratchet wheel 20 which is connected to the shaft 5 in a rotationally fixed way. The rotationally fixed connection can be achieved for example by longitudinal teeth or by splines. At an outer circumferential face, the ratchet wheel 20 comprises a plurality of circumferentially distributed engagement recesses 21 which can be form-lockingly engaged by the locking member 14 via its locking tooth 16. The locking member 14 can be transferred into a locking position in which it is form-lockingly connected to the ratchet wheel 20, so that the ratchet wheel 20 is prevented from carrying out a rotational movement. In the unlocked position, the locking member 14 is pivoted outwardly relative to the ratchet wheel 20, so that the ratchet wheel 20 and thus the driveline of the motor vehicle are freely rotatable.

Furthermore, there is provided a locking sensor 23 which records the switched position of the locking member 14 and which transmits a corresponding locking signal to the electronic control unit. The locking sensor 23 is fixed to a stationary component, for example to the gearbox housing and is able to identify whether the locking member 14 form-lockingly engages the locking gear 20, whether it is in a tooth-on-tooth position or whether it is completely pivoted away from the ratchet wheel 20.

In addition, the parking lock assembly 2 comprises a parking lock sensor 33 (shown in FIG. 6 only) which identifies the driver's intention to the effect that the parking lock assembly 2 should be actuated. The parking lock sensor 33 can be integrated in the gear lever, with the parking lock sensor 33 being configured to recognise when the driver sets the gear lever to the parking position "P" or from the parking position "P" into a different position, or there can be provided a different vehicle-specific switch.

Furthermore, there is provided a speed sensor 35 (shown in FIG. 6 only) which generates a speed signal representing the rotational speed of the shaft 5 and transmits same to the electronic control unit. The speed of the shaft 5 can be measured directly on the shaft 5 for example or it can be determined by being calculated on the basis of the vehicle speed.

Below, there will follow a description of the switching process for blocking the driveline by the inventive parking lock assembly 2 with reference to FIGS. 1 to 3.

When the parking lock sensor 2 records the driver's intention to the effect that the vehicle should be parked, a parking lock signal is generated by the electronic control unit. If, with an applied parking lock signal, the speed signal, which represents the rotational speed of the driveshaft 5, is below a predetermined limit value, the locking mechanism 6 is activated in the closing sense. The actuator 7 is controlled accordingly by the electronic control unit, so that the first spring loads the sliding element 8 and, respectively, the pressure element 10 towards the locking element 14.

If, when actuating the locking mechanism 5, the locking tooth 16 is positioned opposite an engagement recess 21 of the ratchet wheel 20, as shown in FIG. 1, the form-locking engagement takes place directly, so that the shaft 5 is blocked. The condition in which the locking tooth 16 form-lockingly engages a recess 21 of the ratchet wheel 20 is illustrated in FIG. 2.

Figure 2:
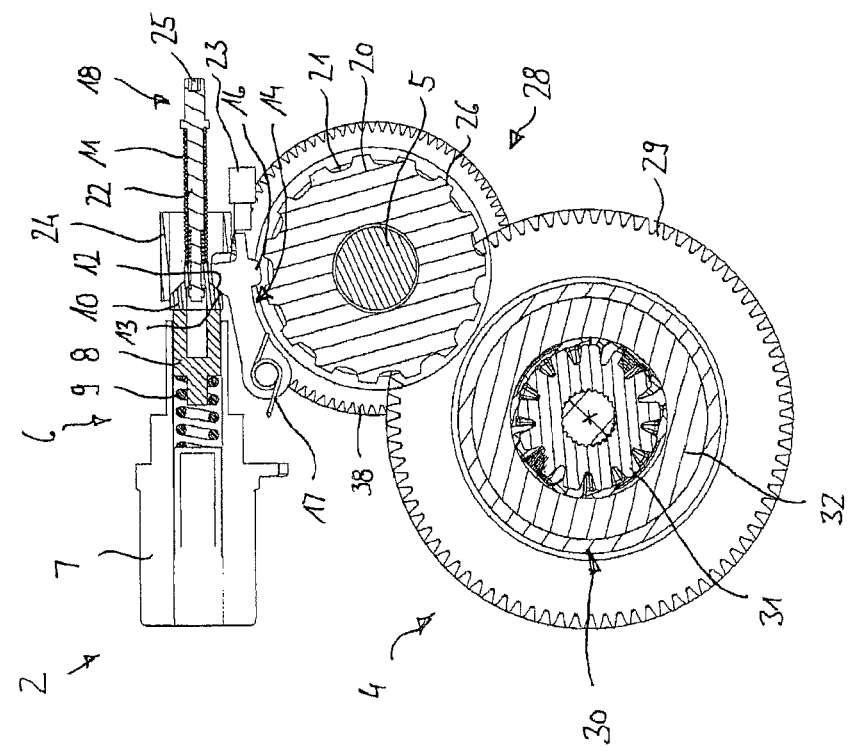
FIG. 2 shows the parking lock assembly according to FIG. 1 in a closed position.
Figure 3:
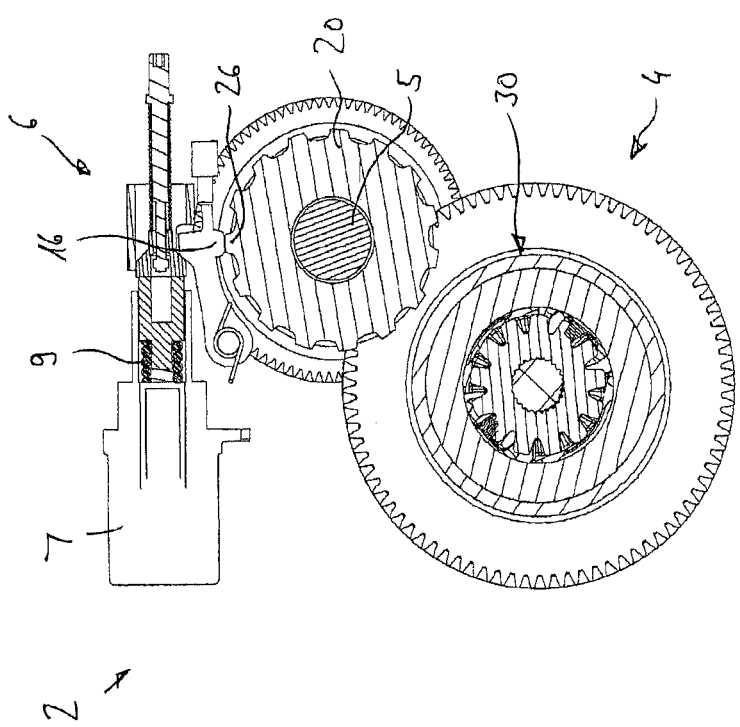
FIG. 3 shows the parking lock assembly according to FIG. 1 in an axial view in an open position, with a locking tooth being positioned opposite a web of a locking gear.

If, when actuating the locking mechanism 6, the locking tooth 16 is positioned opposite a web 26 which is formed between two circumferentially adjoining engagement recesses 21, as illustrated in FIG. 3, the sliding element 8 and the pressure element 10 connected thereto initially remain in an unchanged position. The first spring 9 is axially pretensioned via the force of the actuator 7, against the holding force of the pressure element 10 which is axially supported against the locking member 14. When the shaft 5 continues to rotate, there is reached a rotational position in which the locking tooth 16 and an engagement recess 21 are positioned opposite one another. Thus, the locking member 14, as a result of the spring force of the pretensioned first spring 9, is pressed into the engagement recess 21, so that the ratchet wheel 20 is prevented from carrying out the rotational movement and the shaft 5 is blocked. This condition is shown in FIG. 2.

Below, there will follow a description of the switching operation for blocking the driveline by the inventive parking lock assembly with reference to FIGS. 1 and 2.

The starting point is the condition in which the locking tooth 16 form-lockingly engages a corresponding recess 21 of the ratchet wheel 20, so that the shaft 5 is prevented from carrying out a rotational movement, as illustrated in FIG. 2. When, at this point, the parking lock sensor 33 records the driver's intention to the effect that the vehicle should be moved, i.e. that the driveline should be released, the electronic control unit generates a corresponding parking lock signal which activates the locking mechanism 6 in the opening sense. For example, the parking lock sensor 33 can be integrated into the gear lever and can recognize when the driver moves the gear lever from the parking position "P" into a different position.

If the vehicle, during the activation of the locking mechanism 6, is standing on a surface with either no or only a slight inclination, there exist either no forces or only negligible forces between the locking member 14 and the ratchet wheel 20. By activating the locking mechanism 6 in the opening sense, the supporting element 36, against which the first spring 9 is axially supported, is moved towards the actuator 7, with the pressure element 10 and the sliding element 8 being moved by the second spring 11 towards the actuator 7, so that, due to the spring force of the spring 17, the locking pawl is able to pivot away from the ratchet wheel 20. In this way, the form-locking engagement between the locking member 14 and the ratchet wheel 20 is released and the shaft 5 is released. This condition is shown in FIG. 1. The locking sensor 23 records that the locking member 14 no longer engages the ratchet wheel 20 and transmits a corresponding signal to the electronic control unit.

If, during the activation of the locking mechanism 6, the vehicle is standing on a surface with a larger angle of inclination, the downhill-slope force of the motor vehicle results in considerably forces between the locking member 14 and the ratchet wheel 20. From a certain angle of inclination onwards, said forces can be so high that, in spite of the activated locking mechanism 6, the locking member 14 remains engaged with the ratchet wheel 20, as shown in FIG. 2. This is recorded by the locking sensor 23 which transmits to the electronic control unit a corresponding locking signal representing the position of the locking member 14. The electronic control unit activates the electric drive 3, so that a torque is introduced into the driveline and the shaft 5 respectively. In this way, the stresses in the parking lock assembly 2 which are caused by the weight of the vehicle continue to be reduced until the locking member 14 is disengaged from the corresponding locking recess 21, as illustrated in FIG. 1. In order to ensure that the torque introduced by the electric drive 3 into the driveline acts against the direction of load, i.e. uphill, there can be provided an inclination sensor (shown in FIG. 6 only) which transmits to the electronic control unit an inclination signal representing the inclination of the motor vehicle. Said inclination signal is used by the control unit to determine the direction of rotation in which the electric drive 3 has to be driven to ensure that the torque as generated acts against the direction of the load.

Furthermore, the locking mechanism 6 comprises a returning mechanism 18 which is provided at the holding element 22. For this purpose, the holding element 22, at its end opposed to the actuator 7, comprises torque introducing mechanism 25. The returning mechanism 18 forces the unlocking of the locking mechanism when the electronic control of the parking lock or of the motor vehicle is not in operation. For this purpose, the holding element 22 comprises an outer thread 19 by means of which it can be threaded into a corresponding inner thread of a stationary component, for example of the gearbox housing or of the locking mechanism.

Figure 4:
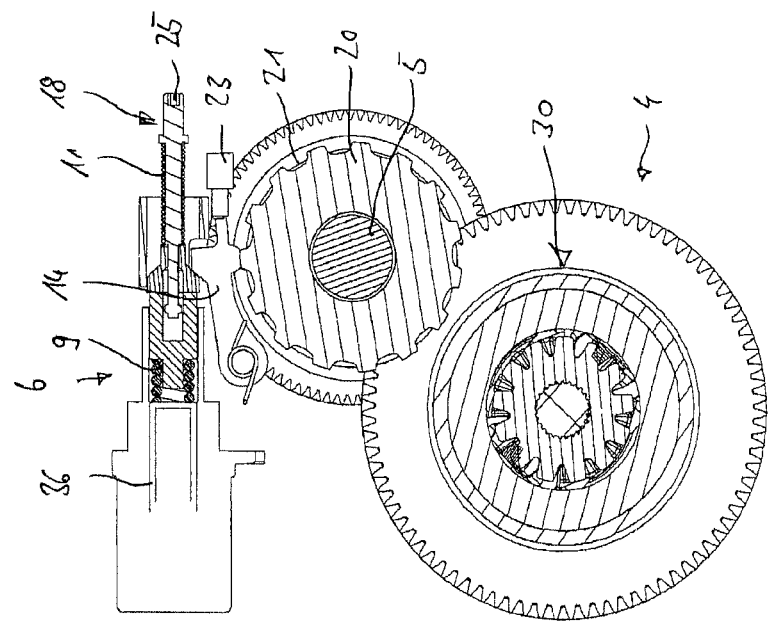
FIG. 4 shows the parking lock assembly according to FIG. 1 in the closed position.
Figure 5:
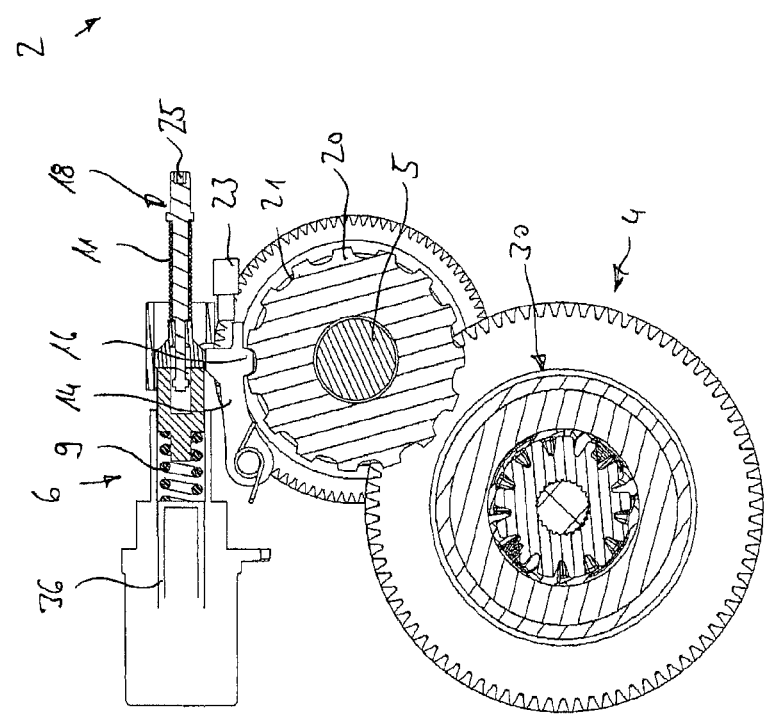
FIG. 5 shows the parking lock assembly according to FIG. 4 with a threaded-in holding element.

The mode of functioning of the mechanical returning mechanism 18 will be described below with reference to FIGS. 4 and 5, the starting point being that the locking tooth 16 form-lockingly engages a corresponding recess 21 of the ratchet wheel 20, so that the shaft 5 is prevented from carrying out a rotational movement, as shown in FIG. 4. By threading the holding element 22 into a suitable stationary component, the pressure element 10 is loaded against the spring force of the first spring 9 into the releasing position. The pressure element 10 releases the locking pawl which, against the force of the spring element 17, is able to pivot outwardly in order to release the shaft 5. This condition is illustrated in FIG. 5.

Figure 6:
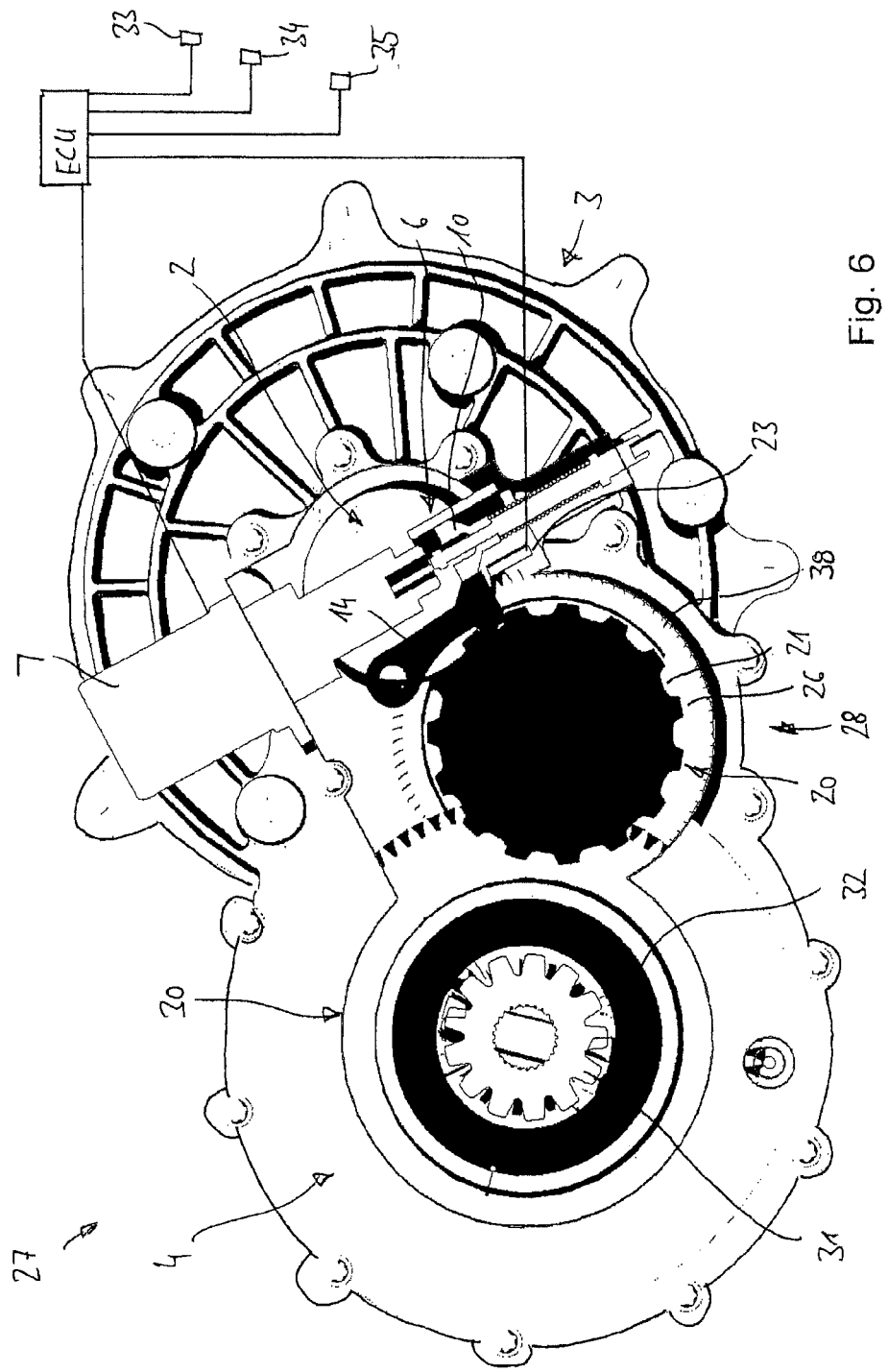
FIG. 6 shows an inventive drive assembly with an inventive parking lock assembly according to FIG. 1 in an axial view.

FIG. 6 shows an inventive drive assembly 27 with an inventive parking lock assembly 2. In addition to the parking lock assembly, the drive assembly 27 comprises a two-stage spur gear drive 28 which is arranged in the driveline downstream the electric drive 3 and drives the driving axle 4. It is possible to see the driving gear 38 of the spur gear drive 28 which engages a driving pinion of the electric drive 3. The ring gear 29 of the differential drive 30 forms the output gear of the spur gear drive 28. The ring gear 29 is firmly connected to the differential carrier 32 of the differential drive 30 in order to introduce a torque into same. It is possible to identify one of the sideshaft gears 31 of the differential drive 30, into which sideshaft gear 31 it is possible to plug in a rotationally fixed way a sideshaft for the purpose of transmitting torque to a corresponding wheel of the vehicle.

Because the parking lock assembly 2 is arranged in the driveline between the electric drive 3 and the differential drive 30, there is achieved a particularly compact design of the drive assembly 27, with the shaft 5 at which there is arranged the parking lock assembly 2 forming the inter-mediate shaft of the spur gear drive 28. In this context it is appreciated that the spur gear drive, as a function of the arrangement of the electric motor and of the layout of the installation space, may also comprise a different design, i.e. it may comprise one or more than two stages or it can be provided in the form of a bevel gear drive. For the purpose of torque transmission, the input shaft of the spur gear drive 28 is drivingly connected to the output shaft of the electric drive 3. A longitudinal axis of the electric drive 3, the intermediate shaft 5 of the spur gear drive 28 and the axis of rotation of the differential carrier 30 and, respectively, of the driving axle 4 are aligned in parallel relative to one another.

Furthermore, FIG. 6 shows the electronic control unit (ECU) which, for data transmitting purposes, is connected to the actuator 7 and to the locking sensor 23. In addition, there are diagrammatic illustrations of the parking lock sensor 33, which recognizes when the parking lock assembly needs to be actuated and passes on a corresponding parking signal to the electronic control unit (ECU), of the inclination sensor 34, which generates a signal representing the inclination of the motor vehicle, and of the speed sensor 35, which represents the speed of the driveshaft 5. It can be seen that the sensors 33, 34, 35 are each connected to the electronic control unit (ECU).

The inventive parking lock assembly 2 is advantageous in that electric drive 3 can be used for reducing the actuating forces required for releasing the locking mechanism 6. In this way it is possible for various parts and components of the locking mechanism 6 to comprise a rougher finish as regards production accuracy. In other words, tolerances may be relaxed. In addition, individual components, more particularly the actuator 7 and the returning spring 17 for the locking pawl, can comprise smaller dimensions. Overall, there is achieved a simplified design in a smaller size and with a correspondingly reduced weight. This also has an advantageous effect on the drive assembly 27 which is provided with an inventive parking lock assembly 2.

The invention claimed is:

1. An electric drive assembly for driving a driving axle of a motor vehicle, said electric drive assembly comprising:
   an electric drive having an electric drive output shaft;
   a differential drive having a differential carrier which is rotatably driveable around an axis of rotation, wherein the axis of rotation of the differential carrier is radially offset relative to a rotational axis of the electric drive output shaft;
   a gear drive arranged between the electric drive and the differential drive so as to transmit torque from the electric drive to the differential drive;
   wherein said gear drive comprises an intermediate shaft which is arranged parallel to the electric drive output shaft and the axis of rotation of the differential carrier, wherein an intermediate shaft axis of said intermediate shaft is radially offset relative to the rotational axis of the electric drive output shaft and relative to the axis of rotation of the differential carrier; and a locking mechanism which is controllable to selectively block a rotational movement of the intermediate shaft or to release the intermediate shaft so as to be freely rotateable;

wherein said locking mechanism comprises an electrically controllable actuator, a locking member which is operable by said actuator and a ratchet wheel which is connected to the intermediate shaft in a rotationally fixed way, wherein the locking member cooperates with the ratchet wheel such that, in a locking position, the ratchet wheel is blocked against rotational movement and, in an unlocking position, the ratchet wheel is freely rotatable, wherein the locking mechanism comprises a guiding sleeve for guiding a linear movement of a pressure element, wherein the pressure element is radially supported against said guiding sleeve, with regard to the intermediate shaft axis.

2. The electric drive assembly according to claim 1, further comprising an electronic control unit for controlling said electric drive and said electrically controllable actuator.

3. The electric drive assembly according to claim 1, wherein the electrically controllable actuator is one of an electromechanical and an electromagnetic actuator, wherein said electrically controllable actuator is connected to a housing of the electric drive assembly.

4. The electric drive assembly according to claim 1, wherein the electrically controllable actuator has an actuator axis and wherein the actuator axis is arranged so as to cross the intermediate shaft at a distance.

5. The electric drive assembly according to claim 1, wherein the locking member is configured so as to be selectively connected to the ratchet wheel in a form-fitting way so that the ratchet wheel is blocked, or the locking member is released from the ratchet wheel so that the ratchet wheel is freely rotatable.

6. The electric drive assembly according to claim 1, wherein the locking member is provided in the form of a locking pawl which is supported so as to be pivotable around a pivot axis that is arranged parallel to the intermediate shaft axis, and wherein the locking pawl comprises at least one locking tooth which can be made to engage circumferentially distributed recesses of the ratchet wheel, wherein the locking pawl is loaded towards the unlocking position by a return spring element.

7. The electric drive assembly according to claim 1, wherein the pressure element is operable by the electrically controllable actuator and cooperates with the locking member, wherein the pressure element can be transferred into a closing position in which the pressure element loads the locking member towards the ratchet wheel and into a release position in which the locking member is released.

8. The electric drive assembly according to claim 7, wherein the pressure element has a conical pressure face for loading a counter face of the locking member, wherein the counter face of the locking member is inclined relative to a perpendicular line on the intermediate shaft axis, which perpendicular line extends through a contact point between the conical pressure face of the pressure element and the counter face of the locking member.

9. The electric drive assembly according to claim 1, wherein the guiding sleeve is arranged coaxially relative to the electrically controllable actuator.

10. The electric drive assembly according to claim 1, wherein the locking mechanism comprises a spring, wherein a pressure element is pretensioned into a closing position by said spring.

11. The electric drive assembly according to claim 1, wherein the gear drive is designed in the form of a two-stage gear drive comprising exactly one intermediate shaft, wherein a first transmission stage is formed by first interengaging gears between the electric drive output shaft and the intermediate shaft and a second transmission stage is formed by second interengaging gears between the intermediate shaft and the differential carrier.

* * * * *